United States Patent
Tomura et al.

(10) Patent No.: US 8,563,453 B2
(45) Date of Patent: Oct. 22, 2013

(54) HIGH ZIRCONIA FUSED CAST REFRACTORY

(71) Applicant: Asahi Glass Company, Limited, Chiyoda-ku (JP)

(72) Inventors: Nobuo Tomura, Chiyoda-ku (JP); Hironori Sato, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/840,040

(22) Filed: Mar. 15, 2013

(65) Prior Publication Data

US 2013/0210607 A1 Aug. 15, 2013

Related U.S. Application Data

(63) Continuation of application No. PCT/JP2011/073015, filed on Oct. 5, 2011.

(30) Foreign Application Priority Data

Oct. 6, 2010 (JP) .................................. 2010-227016

(51) Int. Cl.
C04B 35/484 (2006.01)
(52) U.S. Cl.
USPC .......................................... 501/104; 501/105
(58) Field of Classification Search
USPC .................................. 501/104, 105, 106, 107
See application file for complete search history.

(56) References Cited

FOREIGN PATENT DOCUMENTS

| JP | 56-129675 | 10/1981 |
|---|---|---|
| JP | 63-285173 | 11/1988 |
| JP | 3-218980 | 9/1991 |
| JP | 4-193766 | 7/1992 |
| JP | 8-277162 | 10/1996 |
| JP | 9-2870 | 1/1997 |
| JP | 2007-176736 | 7/2007 |
| JP | 2009-527454 | 7/2009 |

OTHER PUBLICATIONS

International Search Report issued Dec. 27, 2011 in PCT/JP2011/073015 filed Oct. 5, 2011.
U.S. Appl. No. 13/839,175, filed Mar. 15, 2013, Tomura.

*Primary Examiner* — Karl Group
(74) *Attorney, Agent, or Firm* — Oblon, Spivak, McClelland, Maier & Neustadt, L.L.P.

(57) ABSTRACT

To provide a high zirconia fused cast refractory which hardly has cracks, and has excellent durability and reusability, at the time of production of the refractory and during use for a glass melting furnace. A high zirconia fused cast refractory which has a chemical composition comprising from 85 to 95 mass % of $ZrO_2$, at least 2.5 mass % of $SiO_2$, at most 0.04 mass % of $Na_2O$, at most 0.04 mass % of $B_2O_3$, and at most 0.04 mass % of $P_2O_5$, containing SrO as an essential component, and containing at least one of $K_2O$ and $Cs_2O$, wherein contents of SrO, $K_2O$ and $Cs_2O$ satisfy the relations of the following formula (1) and (2) at the same time:

$$0.20 \leq [0.638 \times C_{K_2O} + 0.213 \times C_{Cs_2O} + 0.580 \times C_{SrO}]/C_{SiO_2} \leq 0.40 \quad (1)$$

$$0.10 \leq 0.580 \times C_{SrO}/C_{SiO_2} \quad (2)$$

9 Claims, No Drawings

HIGH ZIRCONIA FUSED CAST REFRACTORY

TECHNICAL FIELD

The present invention relates to a high zirconia fused cast refractory. Particularly, it relates to a high zirconia fused cast refractory having excellent durability and reusability even when applied to a glass melting furnace, and being excellent in the productivity.

BACKGROUND ART

Heretofore, a high zirconia fused cast refractory comprising at least 80 mass % of $ZrO_2$ as a chemical component has been used as a refractory for a glass melting furnace. A high zirconia fused cast refractory, which has high corrosion resistance against molten glass and low contamination properties, has been frequently used for a portion of contact with molten glass of a glass melting furnace for glass which is required to have high quality, such as substrate glass for a flat panel display.

The microstructure of a high zirconia fused cast refractory is composed of a slight quantity of pores, a large amount of zirconia ($ZrO_2$) crystal grains and a small amount of matrix glass with which the space between the grains is filled. This matrix glass contains $SiO_2$ as the main component and contains other oxides, such as $Al_2O_3$, $Na_2O$, $B_2O_3$ and $P_2O_5$.

A high zirconia fused cast refractory is exposed to temperature changes in cooling step at the time of its production, and during the heating in a glass melting furnace and during the cooling at the time of suspension of operation, by the process in operation and by corrosion of the refractory itself. By such temperature changes, a thermal stress, and a transformation stress caused by reversible transformation of zirconia crystals accompanied by a significant volume change in a temperature range in the vicinity of 1,000° C., occur in the interior of the refractory. When matrix glass having appropriate thermomechanical properties in an appropriate amount is contained in the refractory, the refractory is flexible against the above stresses, and the stresses are relaxed, whereby no cracks will form on the refractory.

Whereas, if the thermomechanical properties of the matrix glass are inappropriate or if the amount of the matrix glass is insufficient, cracks may form at the time of production of the high zirconia fused cast refractory or during the heating when the refractory is applied to a glass melting furnace. If the refractory has cracks when applied to a portion of contact with molten glass, this portion will be severely eroded by molten glass, whereby the durability of the refractory will significantly be decreased.

In the interior of a high zirconia fused cast refractory, zircon crystals ($ZrO_2 \cdot SiO_2$) may be formed in some cases. The zircon crystals in the interior of the refractory are formed by reaction of $ZrO_2$ and $SiO_2$ in the matrix glass, and accordingly formation of the zircon crystals leads to a decrease in the matrix glass in the refractory. Such a refractory in which zircon crystals are formed and the amount of the matrix glass which relaxes the thermal stress and the transformation stress is reduced becomes fragile and is likely to have cracks even by a slight temperature change.

Further, even in a high zirconia fused cast refractory in which zircon crystals are hardly formed by the refractory itself, zircon crystals may be formed by a reaction with molten glass in some cases. This is because one or both of elution of chemical components which suppress formation of zircon crystals in the refractory into molten glass, and invasion of chemical components which accelerate formation of zircon crystals into the refractory from molten glass, occurs. The tendency of the zircon crystals to be formed by the reaction with molten glass is remarkable when the refractory is in contact with low alkali glass such as liquid crystal substrate glass or with alkali-free glass.

Accordingly, in a case where a high zirconia fused cast refractory in which zircon crystals are likely to be formed by the thermal history by the refractory itself, or a high zirconia fused cast refractory in which zircon crystals are hardly formed by the refractory itself but zircon crystals are likely to be formed by a reaction with molten glass, is used as a refractory for a glass melting furnace, even when no cracks form at the time of production and even when no cracks form during the heating, zircon crystals may be formed in the interior of the refractory in operation, whereby cracks are likely to form by the temperature changes in operation, and the durability of the refractory is significantly decreased.

In general, since the durability of the refractory is a factor which determines the life of a glass melting furnace, formation of cracks in the refractory is one cause to increase the cost for glass production.

Further, in a high zirconia fused cast refractory in which no zircon crystals are formed in a state where the glass meting furnace is in operation, no cracks will form, or even if cracks will form, they are few and small as compared with a refractory in which zircon crystals are formed, and formation of new cracks or propagation of existing cracks during the cooling when the operation of the glass melting furnace is suspended for e.g. adjustment of production tends to be little, and accordingly such a refractory is relatively easily reused.

On the other hand, in a high zirconia fused cast refractory in which zircon crystals are formed, formation of new cracks and propagation of existing cracks are remarkable during the cooling, and further, formation of cracks and propagation occur during the heating again, and thus reusing such a refractory is difficult. Even if it is reused, no high durability will be obtained, and the furnace life will be short. That is, a high zirconia fused cast refractory in which zircon crystals are likely to be formed by itself or by a reaction with molten glass, even if it has a remaining life in a state where the glass melting furnace is in operation, is unsuitable for reuse after suspension of operation.

A means to suppress formation of cracks in a high zirconia fused cast refractory at the time of production, during the heating and in operation has been studied.

Patent Document 1 discloses a high zirconia fused cast refractory which has a chemical composition comprising from 85 to 97 mass % of $ZrO_2$, from 2 to 10 mass % of $SiO_2$, at most 3 mass % of $Al_2O_3$ and from 0.1 to 3 mass % of $P_2O_5$, and containing substantially no rare-earth oxide, whereby cracks to be formed at the time of production are suppressed. However, this high zirconia fused cast refractory contains $P_2O_5$ which accelerates formation of zircon crystals, and has a drawback such that zircon crystals are likely to be formed even by the refractory itself.

Patent Document 2 proposes a high zirconia fused cast refractory which has a chemical composition comprising from 90 to 98 mass % of $ZrO_2$ and at most 1 mass % of $Al_2O_3$, containing no $Li_2O$, $Na_2O$, $CuO$, $CaO$ and $MgO$, and containing from 0.5 to 1.5 mass % of $B_2O_3$, or containing from 0.5 to 1.5 mass % of $B_2O_3$ and containing at most 1.5 mass % of one member selected from $K_2O$, $SrO$, $BaO$, $Rb_2O$ and $Cs_2O$ or a total content of two or more of them of at most 1.5 mass %, whereby cracking at the time of production is suppressed, and the electrical resistivity is increased using an element component having a large cation radius. However, the high zirconia fused cast refractory has a high content of $B_2O_3$ which accelerates formation of zircon crystals, and has a drawback such that zircon crystals are likely to be formed even by the refractory itself.

Patent Document 3 discloses a refractory which has a chemical composition comprising from 90 to 95 mass % of $ZrO_2$, from 3.5 to 7 mass % of $SiO_2$, and from 1 to 3 mass % of $Al_2O_3$, and containing substantially no $P_2O_5$, $B_2O_3$ and CuO, whereby a high zirconia fused cast refractory excellent in the heat cycle resistance can be obtained. The reason which excellent heat cycle resistance is obtained is considered by the present inventors to be because the viscosity of the matrix glass is appropriate, and zircon crystals are hardly formed. However, even the high zirconia fused cast refractory according to this invention has such drawbacks that under conditions of contact with glass, the effect to suppress formation of zirconia crystals is insufficient, and cracks are likely to form in production of a relatively large refractory.

Patent Document 4 discloses a refractory which has a chemical composition comprising from 90 to 95 mass % of $ZrO_2$, from 3.5 to 7 mass % of $SiO_2$, from 1.2 to 3 mass % of $Al_2O_3$ and from 0.1 to 0.35 mass % of $Na_2O$ and/or $K_2O$, and containing substantially no $P_2O_5$, $B_2O_3$ and CuO, whereby improvement in the heat cycle resistance and suppression of formation of zircon crystals are realized. However, even the high zirconia fused cast refractory of this invention has an insufficient content of $Na_2O$ and $K_2O$ which are effective to suppress formation of zircon crystals and thereby has an insufficient effect to suppress formation of zircon crystals under conditions of contact with molten glass.

Patent Document 5 proposes a refractory which has a chemical composition comprising from 89 to 96 mass % of $ZrO_2$, from 3.5 to 7 mass % of $SiO_2$, from 0.2 to 1.5 mass % of $Al_2O_3$, from 0.05 to 1.0 mass % of $Na_2O+K_2O$, less than 1.2 mass % of $B_2O_3$, less than 0.5 mass % of $P_2O_5$, higher than 0.01 mass % and less than 1.7 mass % of $B_2O_3+P_2O_5$, less than 0.3 mass % of CuO, at most 0.3 mass % of $Fe_2O_3+TiO_2$, from 0.01 to 0.5 mass % of BaO, and at most 0.3 mass % of $SnO_2$. Patent Document 5 discloses that addition of $Na_2O$, $K_2O$ and BaO cause unfavorable properties of $P_2O_5$ and $B_2O_3$ which accelerate formation of zircon crystals, to disappear. However, even the high zirconia fused cast refractory of this invention still has an insufficient effect to suppress formation of zircon crystals under conditions of contact with molten glass.

Patent Document 6 discloses a refractory which has a chemical composition comprising from 87 to 94 mass % of $ZrO_2$, from 3.0 to 8.0 mass % of $SiO_2$, from 1.2 to 3.0 mass % of $Al_2O_3$, higher than 0.35 mass % and at most 1.0 mass % of $Na_2O$ and higher than 0.02 mass % and less than 0.05 mass % of $B_2O_3$, containing substantially no $P_2O_5$ and CuO, and having a mass ratio of $Al_2O_3$ to $Na_2O$ of from 2.5 to 5.0, whereby formation of zircon crystals by the refractory itself is suppressed. However, in this high zirconia fused cast refractory based on this invention, since the content of $Na_2O$ having a high diffusion rate is optimized relative to $Al_2O_3$, under conditions of contact with molten glass containing $Na_2O$ only in a low content, elution of $Na_2O$ occurs in priority. That is, the high zirconia fused cast refractory has a drawback such that by such elution, the mass ratio of $Na_2O$ and $Al_2O_3$ will soon deviate from the initial value in an unused state, and the effect to suppress formation of zircon crystals is soon lost.

PRIOR ART DOCUMENTS

Patent Documents

Patent Document 1: JP-A-56-129675
Patent Document 2: JP-A-63-285173
Patent Document 3: JP-A-3-218980
Patent Document 4: JP-A-6-72766
Patent Document 5: JP-A-9-2870
Patent Document 6: JP-A-2007-176736

DISCLOSURE OF INVENTION

Technical Problem

The present invention has been made to solve the above problems, and its object is to provide a high zirconia fused cast refractory which is less likely to have cracking at the time of production, during the heating, by temperature changes during use and the cooling at the time of suspension of operation, and is thereby have high durability.

Solution to Problem

The present inventors have conducted extensive studies and as a result, found a high zirconia fused cast refractory in which zircon crystals are hardly formed even under conditions of contact with molten glass even by the refractory itself, and has low residual volume expansion even under temperature cycle conditions.

That is, the high zirconia fused cast refractory of the present invention has a chemical composition comprising from 85 to 95 mass % of $ZrO_2$, at least 2.5 mass % of $SiO_2$, at most 0.04 mass % of $Na_2O$, at most 0.04 mass % of $B_2O_3$, and at most 0.04 mass % of $P_2O_5$, containing SrO as an essential component, and containing at least one of $K_2O$ and $Cs_2O$, wherein contents of SrO, $K_2O$ and $Cs_2O$ satisfy the relations of the following formula (1) and (2) at the same time:

$$0.20 \leq [0.638 \times C_{K2O} + 0.213 \times C_{Cs2O} + 0.580 \times C_{SrO}]/C_{SiO2} \leq 0.40 \quad (1)$$

$$0.10 \leq 0.580 \times C_{SrO}/C_{SiO2} \quad (2)$$

wherein $C_{K2O}$ is the content (mass %) of $K_2O$ in the fused cast refractory, $C_{Cs2O}$ is the content (mass %) of $Cs_2O$ in the fused cast refractory, $C_{SrO}$ is the content (mass %) of SrO in the fused cast refractory, and $C_{SiO2}$ is the content (mass %) of $SiO_2$ in the fused cast refractory.

Advantageous Effects of Invention

The high zirconia fused cast refractory of the present invention is free from problems of cracking at the time of production of the refractory and is excellent in the productivity, in the refractory, zircon crystals are hardly formed even in contact with molten glass even by the refractory itself, the refractory hardly has cracking at the time of production of the refractory, during the heating, during use and during the cooling, and it its excellent in the durability and the reusability.

Further, the high zirconia fused cast refractory of the present invention hardly has cracks even under conditions of contact with molten glass and is excellent in the durability, and accordingly a long life of a furnace will be obtained even when it is applied to a portion of contact with molten glass of a glass melting furnace, the amount of corrosion of the refractory can be reduced, and contamination of molten glass can be reduced. Further, it hardly has cracks even during the cooling at the time of suspension of operation of the glass melting furnace by e.g. adjustment of production, and during the heating again, and accordingly it is possible to use the refractory which is less eroded and does not reach the end of its life. Further, the high zirconia fused cast refractory of the present invention is free from problems of cracking which influence the yield at the time of production, and accordingly it is excellent in the productivity of the refractory, and as a result, products can be produced relatively at a low cost.

DESCRIPTION OF EMBODIMENTS

The high zirconia fused cast refractory of the present invention (hereinafter sometimes referred to simply as a fused cast refractory or a refractory) comprises the above chemical components. The roles played by these respective components in the refractory will be described below. In the following description, three components of $Na_2O$, $B_2O_3$ and $P_2O_5$ are represented by outer percentage assuming that the total content of components other than the above three components to be 100 mass %. On the other hand, components other than the three components of $Na_2O$, $B_2O_3$ and $P_2O_5$ are represented by inner percentage.

In this specification, "inner percentage" is meant for the proportion of the component in 100 mass % when the entire fused cast refractory (excluding any component represented by outer percentage) is taken as 100 mass %. For example, "$ZrO_2$ is contained in an amount of 90 mass % in terms of inner percentage" means that when the entire fused cast refractory (excluding any component represented by outer percentage) is taken as 100 mass %, $ZrO_2$ is contained in an amount of 90 mass % in such 100 mass %.

On the other hand, "outer percentage" is a proportion, based on the entire fused cast refractory (excluding any component represented by outer percentage), of a component not included in 100 mass % when the entire fused cast refractory (excluding any component represented by outer percentage) is taken as 100 mass %. For example, "$Na_2O$ is contained in an amount of 0.01 mass % in terms of outer percentage" means that when the entire refractory (excluding any component represented by outer percentage) is taken as 100 mass %, $Na_2O$ is additionally contained in an amount of 0.01 mass %.

The zirconia raw material and the zircon raw material to be used for production of the highly high zirconia fused cast refractory inevitably contains from 1 to 3 mass % of $HfO_2$, and $HfO_2$ is not substantially lost e.g. by evaporation at the time of production and remains in the refractory, and accordingly, a usual high zirconia fused cast refractory including the refractory of the present invention contains from 1 to 3 mass % of $HfO_2$. Since $HfO_2$ usually plays the same role as $ZrO_2$ in a high zirconia fused cast refractory, a value for $ZrO_2+HfO_2$ is commonly represented simply as $ZrO_2$, and in the present invention also, a value for $ZrO_2+HfO_2$ is represented as $ZrO_2$.

The fused cast refractory of the present invention is a high zirconia fused cast refractory composed of a large amount of zirconia crystals, a small amount of matrix glass and a very small quantity of pores. $ZrO_2$ has a high resistance to corrosion by molten glass and is contained as a main component in the refractory. Most of this $ZrO_2$ is present as zirconia crystals having an excellent corrosion resistance to molten glass, and only very small amount of it is present in the matrix glass.

That is, the content of $ZrO_2$ dominates the content of zirconia crystals in the refractory of the present invention and thus influences the corrosion resistance. In order to obtain high corrosion resistance to molten glass, the $ZrO_2$ content is required to be at least 85 mass %, and is preferably at least 88 mass %. On the other hand, if the $ZrO_2$ content is higher than 95 mass %, the amount of the matrix glass which relaxes a stress is relatively small, and cracks are likely to form at the time of production, or by temperature changes during the heating, during use and during the cooling. Accordingly, the content of $ZrO_2$ in the refractory of the present invention is from 85 to 95 mass %.

$SiO_2$ is a main component to form the matrix glass. In order to ensure the amount of the matrix glass which functions to relax a stress, $SiO_2$ in an amount of at least 2.5 mass % is required. On the other hand, if a large amount of $SiO_2$ is contained in the refractory, as a matter of course, $ZrO_2$ cannot be contained in a large amount, and the corrosion resistance of the refractory to molten glass is lost. Accordingly, the content of $SiO_2$ in the refractory of the present invention is from 2.5 to 7.5 mass %, preferably from 3.0 to 7.0 mass %.

Further, the present invention is characterized by containing $K_2O$, $Cs_2O$ and $SrO$ as components particularly effective to suppress formation of zircon crystals, and in that the suppression effect depends on the molar ratio of these components to $SiO_2$. That is, when $K_2O$, $Cs_2O$ and $SrO$ are contained in a high total content to the content of $SiO_2$ by molar ratio, zircon crystals are hardly formed by the refractory itself or under conditions of contact with molten glass.

Further, many of low alkali glasses and alkali-free glasses contain a relatively large amount of $SrO$ since they contain no alkali oxides which makes glass melting easy. If such SrO-containing molten glass and the refractory of the present invention are in contact, elution of $SrO$ is slow due to a low concentration gradient between the molten glass and the refractory, and even if $SrO$ is eluted, elution stops once the equilibrium of the $SrO$ concentration between in the molten glass and in the refractory is achieved, and accordingly the effect to suppress formation of zircon crystals will last over a particularly long period of time.

That is, the high zirconia fused cast refractory of the present invention has an effect to suppress formation of zircon crystals by $K_2O$ of which the cation radius is large and elution into molten glass is slow, and $Cs_2O$, and an effect to suppress formation of zircon crystals by $SrO$ of which the cation radius is relatively large and elution is particularly slow into SrO-containing molten glass, in combination, and it is characterized by containing either one or both of $K_2O$ and $Cs_2O$ and containing $SrO$ as an essential component.

$K_2O$ is a component to reduce the viscosity of the matrix glass and at the same time, a component to suppress formation of zircon crystals. $K_2O$ has a role to reduce the viscosity of the matrix glass, and by incorporating $K_2O$ in the refractory, an effect to suppress cracking on the refractory at the time of production, or by the temperature changes during the heating, during use and during the cooling, will be obtained. Further, since the cation radius of K is large, elution of $K_2O$ is slow even upon contact with molten glass, whereby an effect to suppress formation of zircon crystals will last over a long period of time. For example, in a case where the refractory contains no $Cs_2O$ and has a molar ratio of $SrO$ to $SiO_2$ (this is determined by $0.580 \times C_{SrO}/C_{SiO2}$, wherein $C_{SrO}$ is the content (mass %) of $SrO$ in the refractory, and $C_{SiO2}$ is the content (mass %) of $SiO_2$) of 0.10, the molar ratio of $K_2O$ to $SiO_2$ (this is determined by $0.638 \times C_{K2O}/C_{SiO2}$, wherein $C_{K2O}$ is the content (mass %) of $K_2O$ in the refractory, and $C_{SiO2}$ is the content (mass %) of $SiO_2$) is preferably at least 0.06, whereby an excellent effect to suppress formation of zircon crystals will be obtained, and is more preferably at least 0.08.

If the amount of $K_2O$ is insufficient, aluminosilicate crystals such as mullite are likely to be formed by heating at the time of production or during use, thus leading to a decrease in the amount of the matrix glass, whereby cracks are likely to form at the time of production, or by temperature changes during the temperature increase, during use and during the cooling. On the other hand, if $K_2O$ is contained in a particularly high content in the refractory, potassium-containing aluminosilicate crystals such as leucite are likely to be formed by heating at the time of production or during use, thus leading to a decrease in the amount of the matrix glass, whereby cracks are likely to form at the time of production, or by temperature changes during the heating, during use and during the cooling.

$Cs_2O$ is also a component to suppress formation of zircon crystals, and its effect will be obtained even in a low content. Further, since the cation radius of Cs is very large, elution from the refractory is very small even upon contact with molten glass, and an effect to suppress formation of zircon crystals will last over a particularly long period of time. For example, in a case where the refractory contains no $K_2O$ and has a molar ratio of SrO to $SiO_2$ (this is determined by $0.580 \times C_{SrO}/C_{SiO2}$, wherein $C_{SrO}$ is the content (mass %) of SrO in the refractory and $C_{SiO2}$ is the content (mass %) of $SiO_2$) of 0.10, the molar ratio of $Cs_2O$ to $SiO_2$ (this is determined by $0.213 \times C_{Cs2O}/C_{SiO2}$, wherein $C_{Cs2O}$ is the content (mass %) of $Cs_2O$ in the fused cast refractory, and $C_{SiO2}$ is the content (mass %) of $SiO_2$) is preferably at least 0.03, whereby an excellent effect to suppress formation of zircon crystals will be obtained, and is more preferably at least 0.04.

The sum of the molar ratio of $K_2O$ to $SiO_2$ and the molar ratio of $Cs_2O$ to $SiO_2$ is preferably at least 0.07, more preferably at least 0.09.

SrO is also a component to suppress formation of zircon crystals and a component to reduce the viscosity of the matrix glass, like $K_2O$ and $Cs_2O$. Further, SrO is a component contained in low alkali glass and alkali-free glass, glass for a lamp for a cathode ray tube, and the like, and when such molten glass containing SrO and the refractory are in contact with each other, if SrO is contained, the concentration gradient will not be high and elution of SrO from the refractory will be slow. Accordingly, when the refractory of the present invention is applied to melting of glass containing SrO, the effect to suppress formation of zircon crystals by SrO will last over a very long period of time. On the other hand, if excess SrO is contained in the refractory, crystals containing strontium such as strontium silicate will be formed, thus leading to a decrease in the amount of the matrix glass, whereby cracks are likely to form at the time of production, or by temperature changes during the heating, during use and during the cooling.

When $K_2O$, $Cs_2O$ and SrO are contained in the refractory at high concentrations by the molar ratio to $SiO_2$, a high effect to suppress formation of zircon crystals will be obtained. On the other hand, if these components are present in excess, the matrix glass will be excessively softened, whereby cracks are likely to form at the time of production, or as described above, crystallization of the matrix glass may occur or cracks are likely to form at the time of production, or by temperature changes during the heating, during use and during the cooling. The range of the content with which a high effect to suppress formation of zircon crystals will be obtained without such disadvantages, is the range which satisfies the following formula 1.

Further, under conditions of contact with molten glass containing SrO, a composition with a high molar ratio of SrO to $SiO_2$ is preferred to suppress formation of zircon crystals over a long period of time. Specifically, a composition which satisfies the following formula (1) and satisfies the following formula (2) is preferred. The formula (1) and the formula (2) are to calculate the content (mass %) of each component in the refractory to the molar ratio to $SiO_2$.

$$0.20 \leq [0.638 \times C_{K2O} + 0.213 \times C_{Cs2O} + 0.580 \times C_{SrO}]/C_{SiO2} \leq 0.40 \quad (1)$$

$$0.10 \leq 0.580 \leq C_{SrO}/C_{SiO2} \quad (2)$$

wherein $C_{K2O}$ is the content (mass %) of $K_2O$ in the fused cast refractory, $C_{Cs2O}$ is the content (mass %) of $Cs_2O$ in the fused cast refractory, $C_{SrO}$ is the content (mass %) of SrO in the fused cast refractory, and $C_{SiO2}$ is the content (mass %) of $SiO_2$ in the fused cast refractory.

With respect to the above formula (1) and (2), the contents of the respective components should be determined to satisfy the above formula. Particularly, of the formula (1), the upper limit is preferably 0.35, and the lower limit is preferably 0.25. Further, the lower limit of the formula (2) is preferably 0.12.

If the value of the formula (1) exceeds 0.35, crystals other than zirconia crystals may be formed from the matrix glass components at the time of production or during the heating, whereby cracks are likely to form at the time of production or during the heating. Accordingly, it is preferably at most 0.35. Further, in order to obtain the effect to suppress formation of zircon crystals even under conditions of contact with molten glass over a long period of time, the value of the formula (1) is preferably at least 0.25.

Further, the value of the above formula (2) is preferably at least 0.12 for the purpose of obtaining an effect to suppress formation of zircon crystals even under conditions of contact with molten glass over a long period of time. However, if the value of the formula (2) exceeds 0.25, the porosity of the refractory is increased in some cases, thus leading to a decrease of the corrosion resistance of the refractory. Accordingly, the upper limit of the above formula (2) is preferably 0.25.

$Na_2O$ is a component having an effect to suppress formation of zircon crystals by the refractory itself, and its effect to reduce the viscosity of the matrix glass is particularly remarkable, and it accelerates elution of $Al_2O_3$, $K_2O$, $Cs_2O$ and SrO which are components effective to suppress formation of zircon crystals, into molten glass, and accelerates invasion of components which accelerate formation of zircon crystals such as $B_2O_3$, from molten glass, under conditions of contact with molten glass. Further, since Na cations have a small radius, $Na_2O$ will readily be eluted into molten glass upon contact with low alkali glass, alkali-free glass or the like, and accordingly when the refractory is in contact with such molten glass, the effect to suppress formation of zircon crystals will last only in a relatively short period of time. In addition, since the effect to reduce the viscosity of the matrix glass by $Na_2O$ is particularly remarkable, if $Na_2O$ is contained in the refractory of the present invention containing $Al_2O_3$ and $K_2O$ at a relatively high concentration, the viscosity of the matrix glass will excessively be lowered, whereby the shape-retention property at the time of production of the refractory is lowered, and deformation or cracking in the form of tears, will form on an ingot, and accordingly the productivity of the refractory will remarkably be lowered. That is, it is preferred that substantially not $Na_2O$ is contained. Here, "containing substantially no $Na_2O$" means its content of at most 0.04 mass %. Further, the content of $Na_2O$ which is included as an impurity is more preferably at most 0.02 mass %.

$B_2O_3$ is a component to accelerate formation of zircon crystals. If $B_2O_3$ is contained in a large amount, in the refractory, zircon crystals are formed only by the thermal history, and even with a small amount, formation of zircon crystals under conditions of contact with molten glass is accelerated in some cases. Accordingly, with a view to suppressing formation of zircon crystals, the content of $B_2O_3$ is preferably low.

Whereas, $B_2O_3$ has an effect to suppress formation of cracks at the time of production of the refractory even in a low content, and in the present invention in which $Al_2O_3$, $K_2O$ and $Cs_2O$ greatly contribute to suppression of formation of zircon crystals, a $B_2O_3$ content up to 0.04 mass % is accepted, and the content is preferably at most 0.03 Mass %.

$P_2O_5$ is a component to remarkably accelerate formation of zircon crystals. If $P_2O_5$ is contained in a large amount, in the refractory, zircon crystals are formed only by the thermal history, and even with a small amount, formation of zircon crystals under conditions of contact with molten glass is accelerated in some cases. Accordingly, with a view to suppressing formation of zircon crystals, the content of $P_2O_5$ is preferably as low as possible.

On the other hand, $P_2O_5$ has an effect to suppress formation of cracks at the time of production of the refractory even in a low content, and further, depending on the type of the zirconia raw material or the zircon raw material, it is a component which is inevitably included. In a case where inclusion of $P_2O_5$ is not accepted at all, a relatively expensive zircon raw material or zirconia raw material which is an expensive purified raw material or the production area of which is limited must be used. However, in the present invention in which $Al_2O_3$, $K_2O$, $Cs_2O$ and SrO greatly contribute to suppression of formation of zircon crystals, a $P_2O_5$ content up to 0.04 mass % is accepted, and the $P_2O_5$ content is preferably at most 0.03 mass %. Accordingly, the range from which the zircon raw material or the zirconia raw material is selected is not narrowed, and a relatively low raw material cost can be achieved.

In addition to the above components, $Al_2O_3$ may be added. $Al_2O_3$ is a component to reduce the viscosity of the matrix glass and at the same time, a component to suppress formation of zircon crystals to a certain extent. Even under conditions of contact with low alkali glass or alkali-free glass under which formation of zircon crystals is remarkable, since many of such glasses have a relatively high content of $Al_2O_3$, the concentration gradient difference as between the refractory and the molten glass is small, and elution of $Al_2O_3$ from the refractory is slow, and accordingly the effect to suppress formation of zircon crystals will last for a long period of time.

If the $Al_2O_3$ content is less than 0.4 mass %, the viscosity of the matrix glass tends to be too high, and the performance of the matrix glass to relax a stress will be lowered, whereby cracks are likely to form at the time of production, or by temperature changes during the heating, during use and during the cooling. On the other hand, if $Al_2O_3$ is contained in a high content, the viscosity of the matrix glass will be reduced more than necessary, and elution of $K_2O$, $Cs_2O$ and SrO which are effective to suppress formation of zircon crystals, into molten glass, will be accelerated, such being disadvantageous. Further, if the amount of $Al_2O_3$ exceeds 2 mass %, aluminosilicate crystals such as mullite will be formed at the time of production or during use, thus reducing the amount of the matrix glass, whereby cracks are likely to form at the time of production, or by temperature changes during the heating, during use and during the cooling. Further, when $Al_2O_3$ in an amount of from 0.4 to 2 mass % is contained, zircon crystals will hardly be formed by the refractory itself. Accordingly, the content of $Al_2O_3$ in the refractory of the present invention is from 0.4 to 2 mass %, preferably from 0.5 to 1.8 mass %.

$Fe_2O_3$ and $TiO_2$ which are contained as impurities in the raw material (zircon raw material, zirconia raw material or the like) are components to cause coloring and blistering of molten glass, and a high content of them is unfavorable. When the total content of $Fe_2O_3$ and $TiO_2$ is at most 0.3 mass %, there will be no problem of coloring, and the total content is preferably not higher than 0.2 mass %.

Likewise, $Y_2O_3$ and CaO are contained as impurities in the raw material, and they tend to increase the rate of residual volume expansion in a heat cycle test. A total content of $Y_2O_3$ and CaO of at most 0.3 is not problematic, and the total content is preferably not higher than 0.2 mass %.

CuO is a component to cause coloring of molten glass even with a small amount, and accordingly only a content to such a level that substantially no coloring occurs is accepted. In the refractory of the present invention, the CuO content is preferably at most 0.02 mass %, more preferably at most 0.01 mass %.

EXAMPLES

Now, the high zirconia fused cast refractory of the present invention will be described in further detail with reference to Examples. However, it should be understood that the present invention is by no means restricted to such specific Examples.

In order to obtain a high zirconia fused cast refractory by an electrically fusing and casting method, raw materials such as alumina, zircon sand, silica, potassium carbonate, cesium carbonate, strontium carbonate, $B_2O_3$ and $P_2O_5$ were blended to desilicated zircon as a zirconia raw material, to obtain mixed raw materials, and such mixed raw materials were introduced into a single phase arc electric furnace with an output power of 500 kVA equipped with two graphite electrodes and completely melted by Joule heating.

This melt was poured into a graphite mold having an internal volume of 160 mm×200 mm×350 mm preliminarily embedded in a Bayer alumina powder as an annealing material, cast and left to cool to a temperature in the vicinity of room temperature. After the cooling, the ingot and the graphite mold were taken out from the annealing material, and the graphite mold and the ingot were separated to produce the desired high zirconia fused cast refractory.

By adjusting the raw material compositions, high zirconia fused cast refractories having chemical compositions as identified in Tables 1 and 2 were obtained. Table 1 shows Examples of the present invention (Ex. 1 to 8) and Table 2 shows Comparative Examples (Ex. 9 to 15). With respect to the chemical composition of the refractory, values for $ZrO_2$, $SiO_2$, $Al_2O_3$ and SrO are quantitatively analyzed values determined by a wavelength dispersive X-ray fluorescence spectrometer (manufactured by Rigaku Corporation, apparatus name: ZSX Primus II), and values for the other components are quantitatively analyzed values determined by an inductively-coupled plasma emission spectrophotometer (manufactured by Seiko Instruments Inc., apparatus name: SPS 1100). However, quantitative determination for the respective components is not limited to such analysis methods, and can be carried out by another quantitative analysis method.

TABLE 1

|  |  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Composition of refractory (mass %) | $ZrO_2$ | 93.9 | 95.1 | 92.4 | 85.1 | 94.1 | 95.0 | 92.9 | 88.1 |
|  | $SiO_2$ | 3.3 | 2.5 | 3.9 | 7.3 | 3.7 | 3.0 | 4.2 | 6.7 |
|  | $Al_2O_3$ | 0.8 | 0.7 | 2.0 | 1.7 | 0.4 | 0.6 | 0.9 | 1.2 |
|  | SrO | 1.0 | 0.8 | 0.7 | 3.1 | 0.9 | 0.6 | 1.2 | 1.8 |
|  | $K_2O$ | 0.5 | 0.3 | 0.5 | 1.4 | 0.4 | 0.5 | Less than 0.1 | 1.2 |

TABLE 1-continued

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
|  | $Cs_2O$ | 0.3 | 0.3 | 0.3 | 1.2 | 0.2 | Less than 0.1 | 0.6 | 0.7 |
|  | $Na_2O$ | 0.02 | 0.02 | 0.02 | 0.02 | Less than 0.01 | 0.01 | Less than 0.01 | Less than 0.01 |
|  | $B_2O_3$ | 0.02 | 0.03 | 0.02 | 0.04 | Less than 0.01 | 0.03 | 0.03 | Less than 0.01 |
|  | $P_2O_5$ | 0.02 | 0.01 | 0.02 | 0.04 | Less than 0.01 | 0.01 | Less than 0.01 | 0.02 |
|  | $Fe_2O_3 + TiO_2$ | 0.1 | 0.2 | 0.1 | 0.1 | 0.1 | 0.2 | 0.1 | 0.1 |
|  | $CaO + Y_2O_3$ | 0.1 | 0.1 | 0.1 | 0.1 | 0.2 | 0.1 | 0.1 | 0.2 |
|  | Value of the formula 1 | 0.29 | 0.29 | 0.20 | 0.40 | 0.22 | 0.22 | 0.20 | 0.29 |
|  | Value of the formula 2 | 0.18 | 0.19 | 0.10 | 0.25 | 0.14 | 0.12 | 0.17 | 0.16 |
| Characteristics | Cracking at the time of production | Nil | Medium | Small | Nil | Nil | Nil | Small | Small |
|  | Rate of residual volume expansion in heat cycle test (vol %) | 1.2 | 2.1 | 1.4 | 1.1 | 1.7 | 1.7 | 1.9 | 0.9 |
|  | Rate of formation of zircon crystals in heat cycle test (mass %) | Less than 0.5 | Less than 0.5 | Less than 0.5 | Less than 0.5 | Less than 0.5 | Less than 0.5 | Less than 0.5 | Less than 0.5 |
|  | Rate of formation of zircon crystals in immersion test 1 (mass %) | Less than 0.5 | Less than 0.5 | Less than 0.5 | Less than 0.5 | Less than 0.5 | Less than 0.5 | Less than 0.5 | Less than 0.5 |
|  | Rate of formation of zircon crystals in immersion test 2 (mass %) | Less than 0.5 | Less than 0.5 | Less than 0.5 | Less than 0.5 | Less than 0.5 | Less than 0.5 | Less than 0.5 | Less than 0.5 |

TABLE 2

|  |  | Ex. 9 | Ex. 10 | Ex. 11 | Ex. 12 | Ex. 13 | Ex. 14 | Ex. 15 |
|---|---|---|---|---|---|---|---|---|
| Composition of refractory (mass %) | $ZrO_2$ | 97.1 | 90.4 | 90.3 | 88.9 | 93.2 | 90.2 | 90.3 |
|  | $SiO_2$ | 1.8 | 7.6 | 7.0 | 6.9 | 4.0 | 6.5 | 6.1 |
|  | $Al_2O_3$ | 0.4 | 0.8 | 0.8 | 0.8 | 0.7 | 0.8 | 0.8 |
|  | SrO | Less than 0.1 | 0.5 | 1.3 | 1.0 | 0.8 | 1.2 | 1.4 |
|  | $K_2O$ | 0.4 | 0.3 | 0.3 | 1.8 | 0.9 | 0.8 | 0.5 |
|  | $Cs_2O$ | 0.1 | 0.1 | 0.1 | 0.3 | 0.1 | 0.3 | 0.7 |
|  | $Na_2O$ | Less than 0.01 | Less than 0.01 | Less than 0.01 | 0.02 | 0.07 | Less than 0.01 | 0.02 |
|  | $B_2O_3$ | 0.07 | Less than 0.01 | Less than 0.01 | 0.02 | 0.03 | 0.06 | 0.03 |
|  | $P_2O_5$ | 0.04 | 0.03 | Less than 0.01 | 0.02 | Less than 0.01 | 0.02 | 0.08 |
|  | $Fe_2O_3 + TiO_2$ | 0.1 | 0.2 | 0.1 | 0.1 | 0.2 | 0.1 | 0.1 |
|  | $CaO + Y_2O_3$ | 0.1 | 0.1 | 0.1 | 0.2 | 0.1 | 0.1 | 0.1 |
|  | Value of the formula 1 | 0.15 | 0.07 | 0.14 | 0.26 | 0.26 | 0.20 | 0.21 |
|  | Value of the formula 2 | 0.00 | 0.04 | 0.11 | 0.08 | 0.12 | 0.11 | 0.13 |
| Characteristics | Cracking at the time of production | Large | Large | Medium | Medium | Small | Small | Small |
|  | Rate of residual volume expansion in heat cycle test (vol %) | 5.2 | 1.6 | 1.8 | 3.3 | 0.6 | 2.1 | 2.2 |
|  | Rate of formation of zircon crystals in heat cycle test (mass %) | Less than 0.5 | Less than 0.5 | Less than 0.5 | Less than 0.5 | Less than 0.5 | Less than 0.5 | Less than 0.5 |
|  | Rate of formation of zircon crystals in immersion test 1 (mass %) | 1.3 | 3.1 | 2.9 | 1.1 | 1.7 | 1.0 | 1.2 |
|  | Rate of formation of zircon crystals in immersion test 2 (mass %) | 1.1 | 1.9 | 1.4 | Less than 0.5 | 1.6 | 1.5 | 1.4 |

[Cracking at the Time of Production]

Presence or absence of cracks in an outer appearance of the ingot was evaluated as follows.

First, presence or absence of cracks was visually examined, and with respect to a refractory having cracks, the entire surface of the ingot was ground to a depth of 10 mm, and a case where the crack length in the ingot after grinding was at most 10 mm is rated as cracking at the time of production being "small", a case where the crack length was longer than 10 mm and at most 50 mm was rated as cracking at the time of production being "medium", and a case where the crack length was longer than 50 mm was rated as cracking at the time of production being "large". In a case where a refractory has no cracks at the time of production, there will be no problem in production of the refractory. Further, in a case of cracking at the time of production being medium or smaller, such a refractory can easily be produced only by producing an ingot which is the same in size or slightly larger than a refractory of a necessary size and moderately grinding the surface of such an ingot. On the other hand, in a case of cracking at the time of production being large, it is necessary to prepare a very large ingot relative to a refractory of a necessary size, and further to considerably grind or cut the ingot, and accordingly production of such a refractory costs very high and is not realistic.

[Rate of Residual Volume Expansion in Heat Cycle Test]

A 40 mm×40 mm×40 mm sample was cut out from a produced fused cast refractory, and subjected to repetition of heating and cooling between 800° C. and 1,250° C. for 40 times. On that occasion, heating from room temperature to 800° C. was carried out at a rate of 160° C. per hour, and from this point, heating to 1,250° C. at a rate of 450° C. per hour immediately after the temperature reached 800° C., and cooling to 800° C. at a rate of 450° C. per hour immediately after the temperature reached 1,250° C., were carried out for one heat cycle. The heat cycle between 800° C. and 1,250° C. was repeatedly carried out 40 times. After the final heat cycle, the sample was cooled from 800° C. to room temperature at a rate of 160° C. per hour. The dimensions of the sample were measured before and after the test, and the rate of residual volume expansion was determined from the change in the dimensions.

In this heat cycle test, a high zirconia fused cast refractory usually shows residual volume expansion, and in some cases, it has cracks. This residual volume expansion results from a test of a refractory by itself against heat cycles in a relatively low temperature region, and indicates, when the refractory is applied to a glass melting furnace, the cracking resistance in the vicinity of the furnace outer surface at a relatively low temperature away from the molten glass. The rate of residual volume expansion by this test is preferably less than 3 vol %, more preferably less than 2 vol %.

[Rate of Formation of Zircon Crystals in Heat Cycle Test]

Further, in some refractories, zircon crystals are formed by the heat cycle test. With respect to the fused cast refractory after subjected to the above heat cycle test, the rate of formation of zircon crystals was obtained by a powder X-ray diffractometer (manufactured by Rigaku Corporation, apparatus name: RINT-TTR III). That is, with respect to a powder obtained by grinding the sample after the heat cycle test, X-ray diffraction measurement was carried out, peak area ratios of zircon crystals and zirconia crystals were obtained from the resulting diffraction pattern, and the mass % of zircon crystals was determined by the ratio of zircon crystal amount/(zircon crystal amount+zirconia crystal amount).

[Rate of Formation of Zircon Crystals in Immersion Test]

The rate of formation of zircon crystals under conditions of contact with molten glass was obtained by the following immersion test. That is, a 15 mm×25 mm×30 mm sample was cut out from the obtained fused cast refractory, inserted into a 200 cc platinum crucible together with 250 g of alkali-free glass cullet, and heated at a predetermined temperature for a predetermined time in an electric furnace (manufactured by MOTOYAMA K.K., apparatus name: NH-2025D-SP). After cooling, the sample was taken out and ground. With respect to the ground sample powder, X-ray diffraction measurement was carried out, peak area ratios of zircon crystals and zirconia crystals were obtained from the resulting diffraction pattern, and the mass % of zircon crystals were determined from the ratio of zircon crystal amount/(zircon crystal amount+zirconia crystal amount).

Glass used for this test is alkali-free glass having a chemical composition comprising, as calculated as oxides, 60 mass % of $SiO_2$, 8 mass % of $B_2O_3$, 17 mass % of $Al_2O_3$, 3 mass % of MgO, 4 mass % of CaO and 8 mass % of SrO.

The test conditions in the immersion test were as follows.

As immersion test 1, a test at 1,250° C. for 20 days was carried out. In this test, heating from room temperature to 1,250° C. was carried out at a rate of 300° C. per hour, and after the temperature reached 1,250° C., the temperature was maintained for 20 days, the temperature was decreased to 700° C. at a rate of 500° C. per hour and further decreased from 700° C. to room temperature at a rate of 60° C. per hour. In this test, the rate of formation of zircon crystals is preferably at most 4 mass %, more preferably at most 2 mass %.

As the immersion test 2, a test at 1,450° C. for 4 days was carried out. In this test, heating from room temperature to 1,450° C. was carried out at a rate of 300° C. per hour, and after the temperature reached 1,450° C., the temperature was maintained for 4 days, and then the temperature was decreased to 700° C. at a rate of 500° C. per hour and further decreased from 700° C. to room temperature at a rate of 60° C. per hour. In this test, the rate of formation of zircon crystals is preferably at most 4 mass %, more preferably at most 2 mass %.

The above test results are shown in Tables 1 and 2.

As evident from Table 1, the fused cast refractories in the present invention had no cracks at the time of production, or even if they have, the crack size was medium or smaller. Accordingly, the fused cast refractory of the present invention can easily be produced with a high productivity.

Each of the fused cast refractories in Ex. 1 to 8 which are Examples of the present invention had a rate of residual volume expansion in the heat cycle test of at most 2 vol %. Further, although not shown in Table 1, each of samples in Examples of the present invention had no cracks formed in this test. The fused cast refractory of the present invention has a high cracking resistance against temperature changes by the refractory itself.

With respect to each of the refractories in Ex. 1 to 8, no zircon crystals were detected from the sample after the heat cycle test. According to this measurement method, zircon crystals can be detected when the value of zircon crystal amount/(zircon crystal amount+zirconia crystal amount) is 0.5 mass % or higher. Thus, it can be said that in fused cast refractories in Ex. 1 to 8, substantially no reaction to form zircon crystals occurred in the heat cycle test. That is, in the fused cast refractory of the present invention, formation of zircon crystals by the refractory itself is suppressed.

With respect to the fused cast refractories in Ex. 1 to 8, the rate of formation of zircon crystals in the immersion test 1 was at most 0.5 mass %. Further, with respect to the fused cast refractories in Ex. 1 to 8, the rate of formation of zircon crystals in the immersion test 2 was also at most 0.5 mass %.

Since with respect to the refractories in Ex. 1 to 8, the rate of formation of zircon crystals was less than 0.5 mass % in both of the immersion test 1 and the immersion test 2, it can be said that in the fused cast refractory of the present invention, zircon crystals are very hardly formed even under glass contact conditions.

That is, the fused cast refractory of the present invention is free from the problem of cracking at the time of production, it has a low rate of residual volume expansion by the heat cycles by the refractory itself, zircon crystals are hardly formed in it, and further, formation of zircon crystals in it is suppressed even under conditions of contact with molten glass, and accordingly, the refractory of the present invention is a highly durable refractory excellent in the productivity, durability against temperature changes during use and further reusability.

Especially, the fused cast refractory in Ex. 1 is free from cracking at the time of production, has a low rate of residual volume expansion in the heat cycle test and has a low rate of formation of zircon crystals in the glass immersion test, and accordingly, it is a refractory particularly excellent in the productivity, the durability against temperature changes during use and further reusability.

In Table 2, high zirconia fused cast refractories not corresponding to the present invention are shown as Comparative Examples (Ex. 9 to 15).

In Ex. 9, due to insufficient $SiO_2$, i.e. an insufficient amount of the matrix glass, and in Ex. 10, due to small values in the formula 1 and 2, the viscosity of the matrix glass is too high, whereby the cracking at the time of production are large, and it is very difficult to produce such refractories.

In Ex. 9, 12, 14 and 15, respectively due to insufficient $SiO_2$ i.e. an insufficient amount of the matrix glass, insufficient SrO whereby the formula 2 is not satisfied, excess $B_2O_3$, and excess $P_2O_5$, the rate of residual volume expansion in the heat cycle test was high, and these refractories are inferior in the cracking resistance against temperature changes by the refractories themselves.

In Ex. 9 to 15, due to inappropriate compositions, specifically, due to one or both of the formula 1 and 2 being unsatisfactory, excess $Na_2O$, excess $B_2O_3$, and excess $P_2O_5$, the rate of formation of zircon crystals in the immersion test was high. In these refractories, suppression of formation of zircon crystals under conditions of contact with molten glass is insufficient.

From the above results, the high zirconia fused cast refractory of the present invention is excellent in the productivity, it hardly has cracks during the heating, zircon crystals are hardly formed in it even by the thermal history by the refractory itself, and zircon crystals are hardly formed in it even upon contact with molten glass. Accordingly, it is a high zirconia fused cast refractory which hardly has cracks even by temperature changes during use or during the cooling at the time of suspension of operation, which has high durability and which is also excellent in the reusability, and it is particularly suitable for a melting furnace for low alkali glass and alkali-free glass.

INDUSTRIAL APPLICABILITY

The high zirconia fused cast refractory of the present invention has high durability and favorable reusability, prolongs the life of a glass melting furnace, reduces glass defects, and makes it easy to suspend the operation of a glass melting furnace and restart it, and accordingly it is suitable particularly as a refractory for a glass melting furnace.

This application is a continuation of PCT Application PCT/JP2011/073015, filed on Oct. 5, 2011, which is based upon and claims the benefit of priority from Japanese Patent Application No. 2010-227016 filed on Oct. 6, 2010. The contents of those applications are incorporated herein by reference in its entirety.

What is claimed is:

1. A high zirconia fused cast refractory which has a chemical composition comprising from 85 to 95 mass % of $ZrO_2$, at least 2.5 mass % of $SiO_2$, at most 0.04 mass % of $Na_2O$, at most 0.04 mass % of $B_2O_3$, and at most 0.04 mass % of $P_2O_5$, containing SrO as an essential component, and containing at least one of $K_2O$ and $Cs_2O$, wherein contents of SrO, $K_2O$ and $Cs_2O$ satisfy the relations of the following formula (1) and (2) at the same time:

$$0.20 \leq [0.638 \times C_{K2O} + 0.213 \times C_{Cs2O} + 0.580 \times C_{SrO}]/C_{SiO2} \leq 0.40 \quad (1)$$

$$0.10 \leq 0.580 \times C_{SrO}/C_{SiO2} \quad (2)$$

wherein $C_{K2O}$ is the content (mass %) of $K_2O$ in the fused cast refractory, $C_{Cs2O}$ is the content (mass %) of $Cs_2O$ in the fused cast refractory, $C_{SrO}$ is the content (mass %) of SrO in the fused cast refractory, and $C_{SiO2}$ is the content (mass) of $SiO_2$ in the fused cast refractory.

2. The high zirconia fused cast refractory according to claim 1, which further contains from 0.4 to 2 mass % of $Al_2O_3$.

3. The high zirconia fused cast refractory according to claim 1, wherein of the formula (1), the lower limit is 0.25, and the upper limit is 0.35.

4. The high zirconia fused cast refractory according to claim 1, wherein of the formula (2), the lower limit is 0.12, and the upper limit is 0.25.

5. The high zirconia fused cast refractory according to claim 1, wherein the sum of the molar ratio of $K_2O$ to $SiO_2$ and the molar ratio of $Cs_2O$ to $SiO_2$ is at least 0.07.

6. The high zirconia fused cast refractory according to claim 1, wherein the total content of $Fe_2O_3$ and $TiO_2$ is at most 0.3 mass %.

7. The high zirconia fused cast refractory according to claim 1, wherein the total content of $Y_2O_3$ and CaO is at most 0.3 mass %.

8. The high zirconia fused cast refractory according to claim 1, wherein the content of CuO is at most 0.02 mass %.

9. The high zirconia fused cast refractory according to claim 1, which is for a glass melting furnace.

* * * * *